United States Patent Office
3,453,293
Patented July 1, 1969

3,453,293
PROCESS FOR THE PREPARATION OF BI-
CYCLO-(2:2:1) HEPT-5-ENE DICARBOXYL-
IC ACID ANHYDRIDES
Fred Pita, Madison, N.J., assignor to Ciba Corporation,
New York, N.Y., a corporation of Delaware
No Drawing. Filed Jan. 23, 1967, Ser. No. 610,770
Int. Cl. C07d 5/32
U.S. Cl. 260—346.6                             4 Claims

ABSTRACT OF THE DISCLOSURE

An improved process has been provided for preparing compounds of the formula (I) 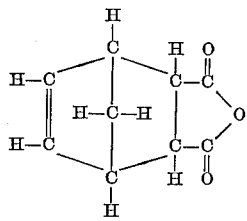

wherein R represents an alkenyl group having 3–8 carbon atoms. According to the process of this invention dicyclopentadiene is depolymerized in a 10–16 carbon atom aliphatic hydrocarbon reaction medium containing metallic sodium, and the resulting sodium cyclopentadiene is reacted in the reaction medium with an alkenyl halide and maleic anhydride to form the compound of Formula I. The final product may be used as a curing agent for epoxy resins.

BACKGROUND

This invention relates to an improved process for producing compounds of the formula (I) 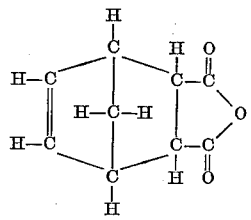

wherein R is an alkenyl containing 3–8 carbon atoms.

The anhydrides of Formula I are excellent curing agents for epoxy resins, diepoxides, or polyepoxides and may also be used as intermediates in the manufacture of unsaturated polyesters. Of particular importance as a curing agent is the compound wherein R represents allyl.

It is well known in the art that the anhydrides of Formula I may be prepared by a Diel-Alder reaction. In this classic process a monomeric cyclopentadiene is reacted with maleic anhydride in an aromatic hydrocarbon reaction medium such as benzene. The Diel-Alder addition reaction may be represented by the following formula

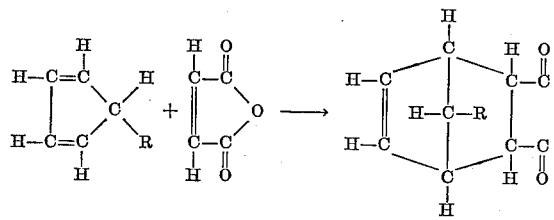

wherein R represents an alkenyl group having 3–8 carbon atoms.

The above process, while appearing relatively simple, is difficult to perform in commercial practice. Cyclopentadiene is a relatively unstable compound which readily polymerizes to dicyclopentadiene. A Diel-Alder type addition of maleic anhydride and dicyclopentadiene will not occur since dicyclopentadiene apparently does not contain a reactive diene grouping.

Because of the unstable nature of cyclopentadiene, it is not available in commercial quantities. The more stable dicyclopentadiene is supplied to the consumer and is depolymerized to cyclopentadiene immediately before being used. Various processes have been suggested for depolymerizing dicyclopentadiene. The suggested processes involve high temperatures and require relatively expensive equipment.

In addition to the problems encountered in depolymerizing dicyclopentadiene, additional problems are encountered in transferring the monomer from the depolymerization equipment to the equipment used for the addition reaction because of the inherent danger to personnel coming in contact with the cyclopentadiene.

A still further problem encountered with the prior art processes is that the addition reaction of the cyclopentadiene and maleic anhydride being conducted in aromatic hydrocarbons which have relatively low flash points (benzene 10–12° C.), presents a substantial fire hazard.

The aromatic hydrocarbon reaction medium suggested in the prior art have to be either heat stripped or vacuum stripped from the final product. The heat stripping step has the adverse effects of both darkening the final product and increasing production time. Vacuum stripping is unsatisfactory because of the time required to strip the solvent.

It is one of the objects of the present invention to overcome the aforementioned problems and difficulties encountered with the prior art processes.

An additional object of this invention is to provide a simple, low temperature depolymerization process for converting dicyclopentadiene to cyclopentadiene.

It is a still further object of this invention to provide a more efficient process for producing bicyclo-(2:2:1) hept-5-ene dicarboxylic acid anhydrides in which monomeric cyclopentadiene does not have to be isolated.

It is an additional object of this invention to provide a process for producing bicyclo-(2:2:1) hept-5-ene dicarboxylic acid anhydrides which is safer, faster and produces an improved product.

Other objects and advantages of this invention will become further apparent from the remainder of the specification and the appended claims.

BRIEF SUMMARY

Briefly the objects of this invention are obtained by providing a novel process in which dicyclopentadiene is depolymerized in an aliphatic hydrocarbon reaction medium having 10–16 carbon atoms, and the resulting cyclopentadiene is reacted in the hydrocarbon reaction medium with metallic sodium, an alkenyl halide and maleic anhydride. The product, which is a bicyclo-(2:2:1) hept-5-ene dicarboxylic acid anhydride, is then recovered from the aliphatic hydrocarbon reaction media by separation.

DETAILED DESCRIPTION

The present process may be conducted in a conventional reaction vessel which is equipped with an agitator, a heat exchange jacket, and a reflux condenser. The vessel should be cleaned, dried, and purged with nitrogen prior to the start of the reaction.

The aliphatic hydrocarbons which are suitable for employment in the process of this invention are members of the methane series having 10–16 carbon atoms. The reaction medium may consist exclusively of one hydrocarbon, such as tetradecane and pentadecane, or may be a mixture of hydrocarbons having between 10 and 16 carbon atoms. It has been found to be preferable to use blends of aliphatic hydrocarbons. The preferred hydrocarbon reaction medium for employment in the present invention is kerosene.

The relative amount of the hydrocarbon reaction medium that is used in the present process can be varied within rather wide limits. It has, however, been found that it is preferable to use approximately 30-50 parts by weight of the reaction medium for each part by weight of metallic sodium.

Approximately one molar equivalent of metallic sodium is added to the reaction medium. It is preferable to add a slight excess of sodium, with approximately 10% excess giving optimum results. The metallic sodium should be cut in small pieces prior to addition. The temperature of the reaction mixture is raised to a temperature above the melting point of sodium, preferably 100°–110° C. The mixture of sodium and the reaction medium is agitated and maintained at or above 100° C. until the sodium becomes evenly dispersed in the reaction medium.

The temperature of the reaction mixture is adjusted to between 170°–185° C. and approximately one-half molar equivalent of dicyclopentadiene is added to the reaction mixture. The addition of dicyclopentadiene should be made over a period of about two hours. After the addition of the dicyclopentadiene is completed, the temperature should be maintained at between 170°–185° C. for approximately one hour. The dicyclopentadiene is depolymerized, and the sodium compound of cyclopentadiene is formed.

The presence of the metallic sodium in the aliphatic hydrocarbon reaction media appears to lower the depolymerization equilibrium temperature of the dicyclopentadiene to about 170°–185° C. In addition, the cyclopentadiene produced readily reacts with the sodium in the reaction media to form sodium cyclopentadiene. The presence of sodium cyclopentadiene in the reaction medium tends to accelerate further depolymerization of the dicyclopentadiene. Because sodium cyclopentadiene is formed, in situ, in the reaction medium, there is no need to isolate or handle the hazardous monomeric cyclopentadiene monomer or to work with the finely divided sodium dispersion as required in the prior art processes. This is a substantial and important advantage of the present invention.

The reaction mixture is cooled to 35°–45° C. The sodium cyclopentadiene is converted to the compound of the formula

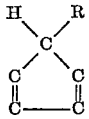

wherein R represents an alkenyl group of 3–8 carbon atoms, by adding approximately one molar equivalent of an alkenyl halide to the reaction mixture. It is preferable to add a slight excess of the alkenyl halide to insure complete conversion of the sodium cyclopentadiene. Typical alkenyl halides which may be used are butenyl chloride, pentenyl bromide, allyl bromide, and especially allyl chloride. A temperature of 30°–45° C. should be maintained and the mixture agitated for approximately one hour after the alkenyl halide addition to insure substantial completion of the reaction.

The reaction mixture at this point is preferably leached with water to remove any water-soluble by-product, such as the sodium halide salts formed on the addition of the alkenyl group to the sodium cyclopentadiene. The leaching is conducted in the conventional manner. An amount of water approximately 25% by volume of the reaction media is generally sufficient to adequately leach the reaction mixture. The reaction mixture should be dried with the usual water scavenger, such as magnesium sulfate, to insure complete removal of the leaching water.

The temperature of the reaction mixture is then adjusted to about 35°–45° C. Approximately one molar equivalent of maleic anhydride is added gradually to the reaction mixture. After the addition of the maleic anhydride is completed, the temperature is raised to and maintained at a temperature of 50°–65° C. for about one hour.

The reaction mixture is then allowed to cool down to room temperature and to stand without agitation until it separates into two separate layers. The bottom layer, which is the product layer, is then drawn off. The upper hydrocarbon layer may be recovered for reuse by conventional purification processes.

The amounts of the reactants used in the process of this invention may be varied. An excess of one reactant may be used to insure that another reactant is completely used up in the process. For example, the addition of an excess of maleic anhydride is desirable in order to eliminate the possibility of unreacted cyclopentadiene being in the final product.

The process of the present invention has many advantages over the processes of the prior art. It does not require high temperatures to depolymerize the dicyclopentadiene. The reaction can be conducted in a single piece of equipment of conventional design. The reaction is safer in that the cyclopentadiene does not have to be isolated, and the reaction medium, for example, kerosene, has a considerably higher flash point (170° C.) than benzene (flash point 10–12° C.) used in the prior art processes. An additional advantage is that the product can be recovered from the reaction medium by a simple separation step rather than the heat or vacuum stripping used in the prior art.

The following examples are for the purpose of further illustrating the process of this invention and are not intended to limit in any way the scope of this invention. The parts and percentages in the following examples are by weight, unless otherwise noted, the relationship between part by weight and part by volume being the same as that between kilogram and the liter.

Example 1

10.5 kg. of metallic sodium is added to 475 liters of refined kerosene in a 150 gallon stainless steel reaction vessel equipped with a reflux condenser and an agitator. The mixture of sodium and kerosene is heated to between 100° and 110° C. and agitated until molten sodium is dispersed throughout the kerosene.

The temperature is raised to about 170° C. and 33 kg. of dicyclopentadiene is gradually added over a two hour period. The temperature is then maintained between 170°–185° C. for about one hour.

The mixture is then cooled to about 40°–45° C. and 32.25 kg. of allyl chloride is added over a one hour period. The 40°–45° C. temperature is maintained for an additional hour.

The mixture is quenched to about 25°–30° C. and leached with 95.5 liters of water containing 150 cc. of glacial acetic acid. The water is then allowed to separate from the reaction mixture and is removed. One kg. of magnesium sulfate is added to the reaction mixture and the mixture is agitated. The magnesium sulfate is then removed by filtration.

The temperature is adjusted to 40°–45° C. and 42 kg. of maleic anhydride is added. The temperature is raised to and maintained at 55°–60° C. for one hour.

The mixture is then allowed to cool to room temperature and to stand until it separates in two layers. The bottom layer, which is the product, is removed. The yield is 77.2 kg. of 7-allyl bicyclo-(2:2:1) hept-5-ene 2:3 dicarboxylic acid anhydride.

Example 2

The above process was repeated with the exception that pentadecane was used in place of kerosene.

Example 3

The process of Example 1 was repeated with the exception that 39 kg. pentenyl chloride was used in place of the allyl chloride.

What is claimed is:

1. An improved process for the preparation of compounds of the formula

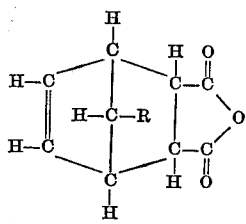

wherein R is an alkenyl group having 3–8 carbon atoms, said process comprising the steps of: melting and dispersing one molar portion of metallic sodium in approximately 30–50 times its weight of a reaction medium selected from the group consisting of aliphatic hydrocarbons of the methane series having 10–16 carbon atoms and a mixture of said hydrocarbons; adding ½ molar equivalent of dicyclopentadiene and raising and maintaining the temperature of the resulting mixture between about 170°–185° C. for about one hour; adjusting the temperature to about 35°–45° C. and adding approximately one molar equivalent of an alkenyl halide having 3–8 carbon atoms, mintaining said 35°–45° C. temperature for about one hour; thereafter adding approximately one molar equivalent of maleic anhydride, raising and maintaining the temperature to about 50°–65° C. for about one hour, thereafter allowing the resulting mixture of the above steps to stand until it separates into two separate layers; and recovering the bottom layer.

2. The process according to claim 1 wherein the reaction media is kerosene.

3. The process according to claim 2 wherein the alkenyl halide is allyl chloride.

4. The process according to claim 3 wherein the reaction medium is leached before the addition of maleic anhydride.

References Cited

FOREIGN PATENTS

| | | |
|---|---|---|
| 578,867 | 7/1964 | Great Britain. |
| 1,308,211 | 9/1962 | France. |

ALEX MAZEL, *Primary Examiner.*

BERNARD DENTZ, *Assistant Examiner.*